US008255903B2

(12) United States Patent
Williams et al.

(10) Patent No.: US 8,255,903 B2
(45) Date of Patent: Aug. 28, 2012

(54) DATA PROCESSING SYSTEM AND METHOD

(75) Inventors: Stuart Williams, Tockington (GB); Yassine Faihe, Champagnier (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1090 days.

(21) Appl. No.: 12/167,347

(22) Filed: Jul. 3, 2008

(65) Prior Publication Data

US 2009/0013319 A1    Jan. 8, 2009

(30) Foreign Application Priority Data

Jul. 5, 2007   (EP) ..................................... 07301209

(51) Int. Cl.
*G06F 9/44*         (2006.01)
(52) U.S. Cl. .......................... 717/174; 717/175; 717/177
(58) Field of Classification Search .................... 717/174
See application file for complete search history.

(56) References Cited

U.S. PATENT DOCUMENTS

| | | | | |
|---|---|---|---|---|
| 6,920,449 B2 * | 7/2005 | Phillips | ........................ | 707/199 |
| 6,944,856 B2 * | 9/2005 | Taylor | .......................... | 717/175 |
| 6,954,928 B2 * | 10/2005 | Allsop et al. | ................... | 717/168 |
| 6,970,924 B1 * | 11/2005 | Chu et al. | ...................... | 709/224 |
| 7,552,430 B2 * | 6/2009 | Napier et al. | ................... | 717/169 |
| 7,562,410 B2 * | 7/2009 | Morris et al. | ................... | 709/220 |
| 7,765,538 B2 * | 7/2010 | Zweifel et al. | .................. | 717/174 |
| 7,836,442 B2 * | 11/2010 | Locker et al. | ................... | 717/175 |
| 7,926,031 B2 * | 4/2011 | Faihe et al. | .................... | 717/177 |
| 7,937,464 B2 * | 5/2011 | Ruppert et al. | ................ | 709/224 |
| 8,151,258 B2 * | 4/2012 | Russell et al. | ................. | 717/172 |
| 2002/0112230 A1 * | 8/2002 | Scott | ............................. | 717/169 |
| 2003/0033597 A1 * | 2/2003 | Allsop et al. | ................... | 717/169 |
| 2003/0145317 A1 * | 7/2003 | Chamberlain | ................ | 717/177 |
| 2004/0205709 A1 * | 10/2004 | Hiltgen et al. | ................ | 717/115 |

(Continued)

FOREIGN PATENT DOCUMENTS

JP         2002-268890           9/2002

OTHER PUBLICATIONS

Audris Mockus and David Weiss, Interval Quality: Relating Customer-Perceived Quality to Process Quality, ACM, 2008, 10 pages, <URL: http://delivery.acm.org/10.1145/1370000/1368190/p723-mockus.pdf>.*

(Continued)

*Primary Examiner* — Thuy Dao
*Assistant Examiner* — Hua Lu (57) ABSTRACT

Embodiments of the present invention relate to a data processing system comprising a receiver to receive a first entity comprising first meta-data, expressed using a semantic web language, defining at least one relationship between first software and at least one associated patch for the first software; means to receive a second entity comprising second meta-data, expressed using the semantic web language, defining at least one relationship between installed software and at least one installed patch for the installed software; and a semantic web query language engine for subjecting the one or more of the first meta-data, second meta-data and an ontology, expressing concepts and relationships between software and at least one patch for said software, to an analysis; and means to output data representing the result of the analysis; the result providing data relating to at least one of the first meta-data and the second meta-data.

20 Claims, 7 Drawing Sheets

U.S. PATENT DOCUMENTS

| | | | | |
|---|---|---|---|---|
| 2004/0210653 A1* | 10/2004 | Kanoor et al. | | 709/223 |
| 2006/0048130 A1* | 3/2006 | Napier et al. | | 717/175 |
| 2006/0080656 A1* | 4/2006 | Cain et al. | | 717/174 |
| 2006/0101457 A1* | 5/2006 | Zweifel et al. | | 717/174 |
| 2006/0123415 A1* | 6/2006 | Dandekar et al. | | 717/177 |
| 2006/0136898 A1* | 6/2006 | Bosscha et al. | | 717/174 |
| 2007/0118609 A1* | 5/2007 | Mullan et al. | | 709/217 |
| 2007/0143390 A1* | 6/2007 | Giambalvo et al. | | 709/200 |
| 2008/0263084 A1* | 10/2008 | Faihe et al. | | 707/103 R |
| 2009/0037902 A1* | 2/2009 | Gebhart et al. | | 717/174 |

OTHER PUBLICATIONS

Joseph Dadzie, Understanding Software Patching, ACM, 2005, 7 pages, <URL: http://delivery.acm.org/10.1145/1060000/1053343/p24-dadzie.pdf>.*

Steve Sawyer, A market-based perspective on information systems development, ACM 2001, 6 pages, <URL: http://delivery.acm.org/10.1145/390000/384168/p97-sawyer.pdf>.*

Audris Mockus, Empirical estimates of software availability of deployed systems, ACM, 2006, 10 pages, <URL: http://delivery.acm.org/10.1145/1160000/1159767/p222-mockus.pdf>.*

Christos Gkantsidis, Planet scale software updates, ACM 2006, 12 pages, <URL: http://delivery.acm.org/10.1145/1160000/1159961/p423-gkantsidis.pdf>.*

P Chevalier, Search engines as penetration testing tools, Google Scholar, 2002, 14 pages, <URL: http://citeseerx.ist.psu.edu/viewdoc/download?doi=10.1.1.201.9443&rep=rep1&type=pdf>.*

European Search Report, Apr. 24, 2008.

"Method of Enabling Automated Invocation of Web Services".

"Method for Automated Assembly of Software Versions", IBM, vol. 30, No. 5, Oct. 1987.

Shehata, M. et al., "A Taxonomy for Identifying Requirement Interactions in Software Systems", Computer Networks, 2006.

* cited by examiner

Figure 1

Figure 3: OWL Ontology

Figure 5: Installation Concept

Figure 6: ovp:dependencySatisfiedBy

Figure 7

DATA PROCESSING SYSTEM AND METHOD

PRIORITY CLAIM

The present application claims priority under 35 U.S.C. 119 to European Patent Application Serial No. 07301209.8, filed on Jul. 5, 2007, which is incorporated by reference in its entirety.

BACKGROUND TO THE INVENTION

Software companies invariably strive to improve products sold to their customers. Often software requires maintenance in the form of patches that are distributed to the customer for installation on their machines to address any bugs in or to provide improvements to the installed software. From a customer's perspective, patching is a complicated, time-consuming and risky task. A system administrator needs to know which patches are available, which are applicable, and in which order they should be applied. This can be achieved manually or automatically by monitoring a software vendor's web-site from time to time and reviewing any available patches pertaining to installed software; reviewing their applicability in light of an inventory of installed applications and any associated installed patches, then selecting, downloading and installing any appropriate patches.

From a software vendor's perspective, a significant proportion of the need for maintenance or support arises as a consequence of improperly patched environments. Addressing these issues increases the software vendor's costs in terms of deploying, or at least utilising, support and maintenance staff to fix the problematical environments. Furthermore, the customer's confidence in the software might be undermined through no fault of the vendor. Still further, once a patch has been improperly installed, backing out, that is, uninstalling the patch, is a far from trivial issue. The patch domain is inherently complex and dynamic. Patches are not isolated items but are interrelated to each other. A given capability in a patch may depend on capabilities provided by other patches. Therefore, a patch may require another patch to be installed to function correctly. Also, a patch may supersede one or more other patches. For example, this happens when a new patch includes bug fixes and new features that exist in other patches thereby making them obsolete. Finally, a patch may be incompatible with another patch or specific configurations.

Currently patch analysis comprises producing a list of all unsuperseded installed patches relating to a customer's products, platforms and versions and making recommendations relating to those patches that have not been installed and relating to those patches that have been superseded.

BRIEF DESCRIPTION OF THE DRAWINGS

Embodiments of the invention will now be described, by way of example only, with reference to the accompanying drawings in which.

DETAILED DESCRIPTION OF EMBODIMENTS

Figure 1:
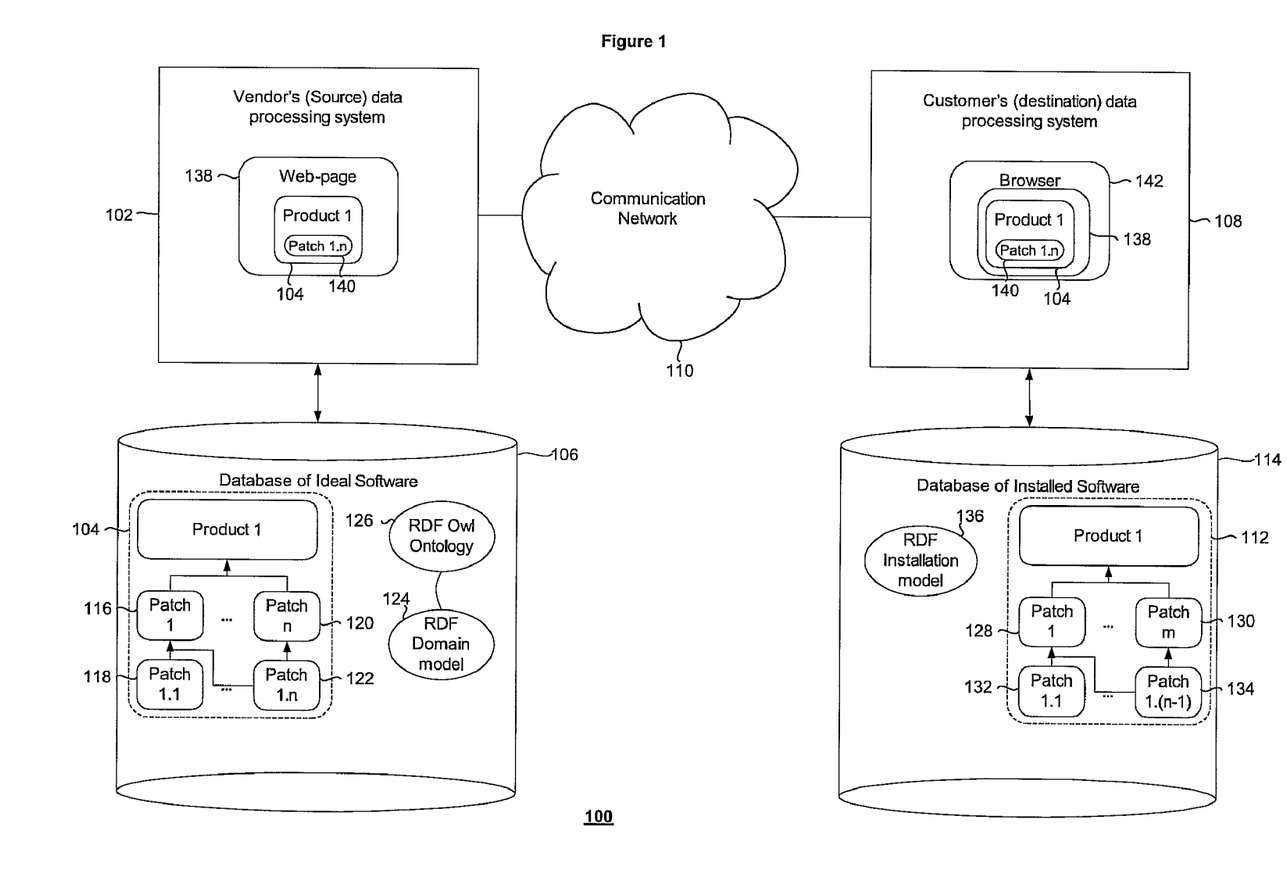
FIG. 1 shows an arrangement comprising a vendor's data processing system and a customer's data processing system communicating via a communication network.

FIG. 1 shows an arrangement 100 comprising a vendor's or source data processing system 102 having an associated database of software 104 stored on a nonvolatile medium 106. The database of software 104 represents an intended installation state for the software 104; known as an intended installation 104 within the context of the present invention. The source data processing system 102 can communicate with a customer's or destination data processing system 108 via a communication network 110. The customer's or destination data processing system 108 comprises installed software 112 stored, for example, using a nonvolatile medium 114 such as an HDD. The intended installation 104 relates to a product, "Product 1". The intended installation 104 has a number of associated patches or upgrades 116 to 122. It can be appreciated that a first level of patches comprising "Patch 1" 116 to "Patch n" 120 is illustrated. However, this has been done for illustrative purposes only and any number of patches from zero upwards might be provided. It can also be appreciated that a second level of patches is illustrated. The second level of patches comprises a number of patches that depend upon, supersede, supplement or otherwise modify patches within the first level of patches. In the illustrated example, it can be appreciated that first "Patch 1.1" 118 to $n^{th}$ "Patch 1.n" 122 are provided. Again, however, any number of patches from zero upwards may be provided in the second level of patches. Still further, although the illustrated example uses two levels of patches, embodiments are not limited to such an arrangement. Embodiments can be realised in which zero or more levels of patches are provided. It can be appreciated that the $n^{th}$ patch 122 of the second level is dependent upon or has some relationship with the first patch 116 of the first level and the $n^{th}$ patch 120 of the first level. Still further, although the illustrated embodiment comprises first to $n^{th}$ patches in the first level and first to $n^{th}$ patches in the second level, embodiments can be realised in which the first and second levels of patches comprise different numbers of patches.

Although the above description of the intended installation 104 and its associated patches has been given in terms of various levels of patches, embodiments are not limited thereto. Furthermore, the levels have been used merely for illustrative purposes. One skilled in the art understands that the relationships between the graphs can be expressed using any arbitrary graph that reflects the relationships of the intended installation 104, that is, the relationships between the base product and one or more patches, if any.

Associated with the intended installation 104 is a domain model 124 expressed using a semantic web language in accordance with an associated ontology 126. In the illustrated embodiment, the domain model 124 has been expressed using a semantic web language such as, for example, RDF/OWL using a vocabulary defined in or by an ontology 126. In the illustrated embodiment, the ontology 126 itself has been expressed using a semantic web language such as, for example, RDF/OWL. Appendices 1 and 2 illustrate in greater detail embodiments of ontology 126 expressed using OWL and Turtle/N3 respectively. Further information relating to OWL, RDF and RDFS is available from, for example, http://www.w3.org/TR/owl-features/ and http://www.w3.org/TR/rdf-syntax-grammar/ and http://www.w3.org/TR/rdf-schema/ respectively. One skilled in the art appreciates that embodiments of the present invention use primarily the above embodiments of semantic web languages. However, embodiments of the invention might use some other semantic web language that provides a formal description of concepts, terms, and relationships within a given knowledge domain.

The installed software 112 also has a number of associated patches 128 to 134. For illustrative purposes only, a first level of patches, comprising a first patch 128 and $m^{th}$ patch 130, and a second level of patches, comprising a first patch 132 to an $(n-1)^{th}$ patch 134, are shown. Again, it will be appreciated that embodiments can be realised in which zero or more levels of patches are provided and in which zero or more patches are provided in each level. Still further, any number or different numbers of patches may be provided in each level.

Associated with the installed product 112 is an installation model 136. The installation model is expressed using a semantic web language such as, for example, RDF, in terms of the above described ontology 126. It will be appreciated that the domain models and the ontologies should be expressed using the same semantic language. The embodiments described herein use RDF.

The vendor's data processing system 102 is merely an example of a source data processing system upon which the idealised state of software is stored or from which the idealised software is accessible. Similarly, the customer's data processing system 180 is merely an example of a destination data processing system upon which software is installed, or from which the installation is accessible, and upon which patches for that software can be installed.

A vendor makes patches for the intended installation 104 available via any convenient means. In the illustrated example, the vendor makes patches for the intended installation 104 available via a web page 138. It can be appreciated that the web page 138 indicates that a patch 140 is available for the intended installation 104. In the illustrated embodiment, the patch 140 that is made available via the web page 138 corresponds to the $n^{th}$ patch 122 of the second level of patches, that is, "Patch 1.n" 122.

The availability of patches is monitored at the customer's data processing system using any convenient means. In the illustrated embodiment, a browser 142 is used to view the web page 138 containing details of the patch 140 that is available for the intended installation 104. A system administrator is able to download and install the available patch 140.

Figure 2:
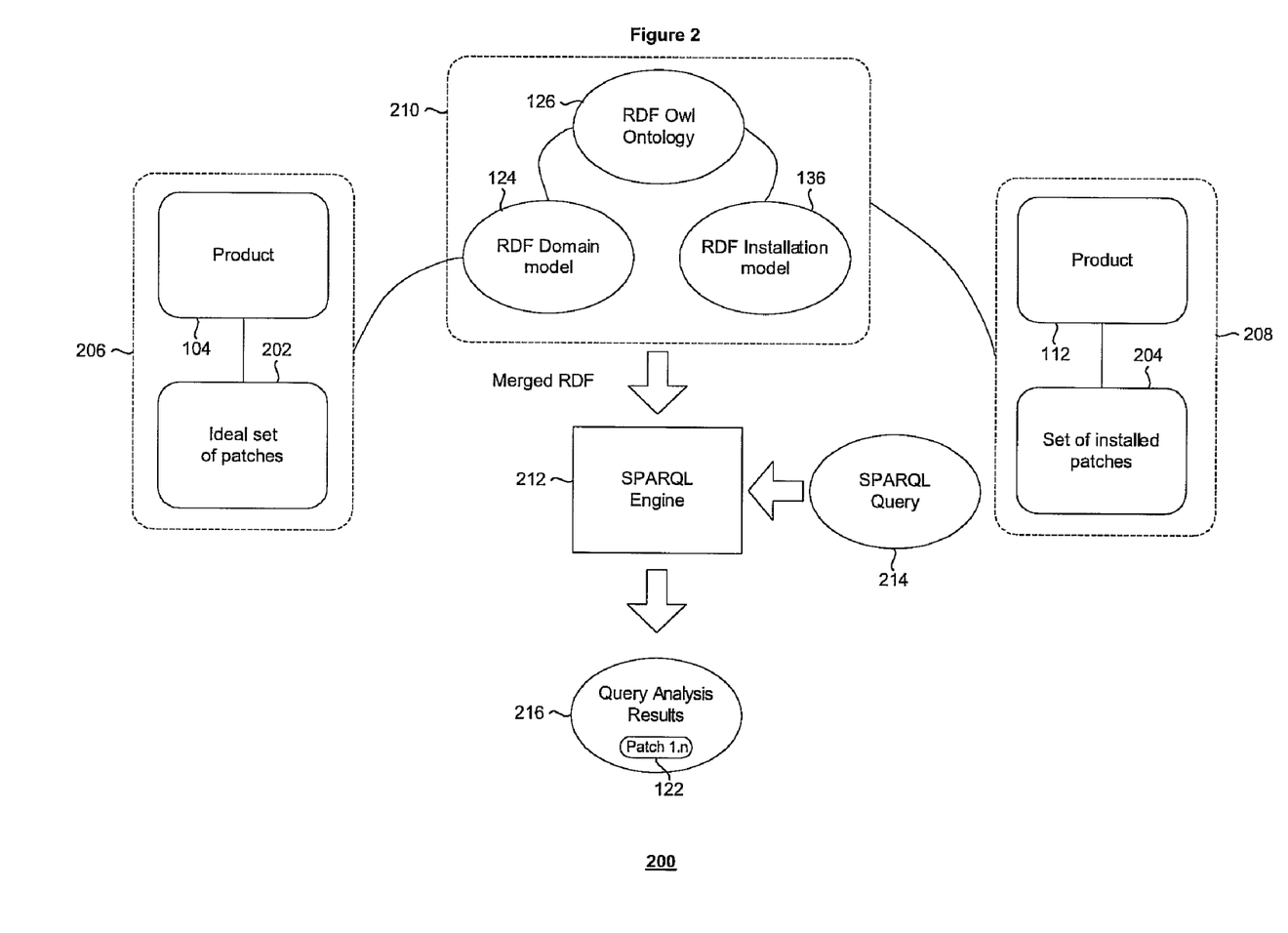
FIG. 2 illustrates a process for analysing the status of an installed product and making recommendations relating thereto.

Referring to FIG. 2, there is shown a process 200 for determining whether or not any patches are available for the installed software 112 or for making recommendations relating to the installed software 112. Returning to the arrangement 100 shown in FIG. 1, it can be appreciated that the state of the intended installation 104 and its associated patches 116 to 122 is different to the state of the corresponding installed software 112 and its associated patches 128 to 134. It can be appreciated that the $n^{th}$ patch 122 for the intended installation 104 is missing from the installed software; the latter comprising an earlier patch 134, that is, "Patch 1.(n-1)" 134.

In particular, FIG. 2 illustrates a process 200 for determining whether or not the state of the installed product or software 112 and its associated patches 128 to 134 can be improved.

For the sake of clarity, the patches 116 to 122 will be referred to as the ideal set of patches 202 for the intended installation 104. Similarly, the installed set of patches 128 to 134 for the installed software 112 will be referred to as the installed set of patches 204. The combination of the intended installation 104 and the ideal set of patches 202 will be referred to as the intended installation set 206. Similarly, the combination of the installed software 112 and the installed set of patches 204 will be referred to as the installed software set 208.

The owl ontology 126, the RDF domain model 124 corresponding to the intended installation set 206 and the RDF installation model 136 corresponding to the installed software set 208 are merged to produce merged RDF 210. The merged RDF 210 is processed by a SPARQL engine 212 in conjunction with a SPARQL query 214. The SPARQL engine 212 produces query analysis results 216 that reflect the result of processing the merged RDF 210 according to the SPARQL query 214. Although embodiments feed merged RDF into the engine, other embodiments can be realised in which the owl ontology 126, the RDF domain model 124 and the RDF installation model 136 are processed by the engine severally, that is, without merging.

The SPARQL query 214 can be any query that is designed to investigate any aspect of the merged RDF 210 of interest. In the illustrated embodiment, the SPARQL query 214 is used to determine whether or not any recommendations can be made to improve the state of the installed software 112 and its associated patches 128 to 134. According to the illustrated embodiment, it will be appreciated that the query and analysis results 216 recommend installation of the $n^{th}$ patch 122 of the second level of patches to bring the installed software 112 and its associated patches 128 to 134 into a state that is consistent with the intended installation 104 and its associated patches 116 to 122. It is this recommendation that is displayed in the web page 138 of the vendor's data processing system to allow it to be downloaded via the browser 142 of the customer's data processing system 108.

Figure 3:
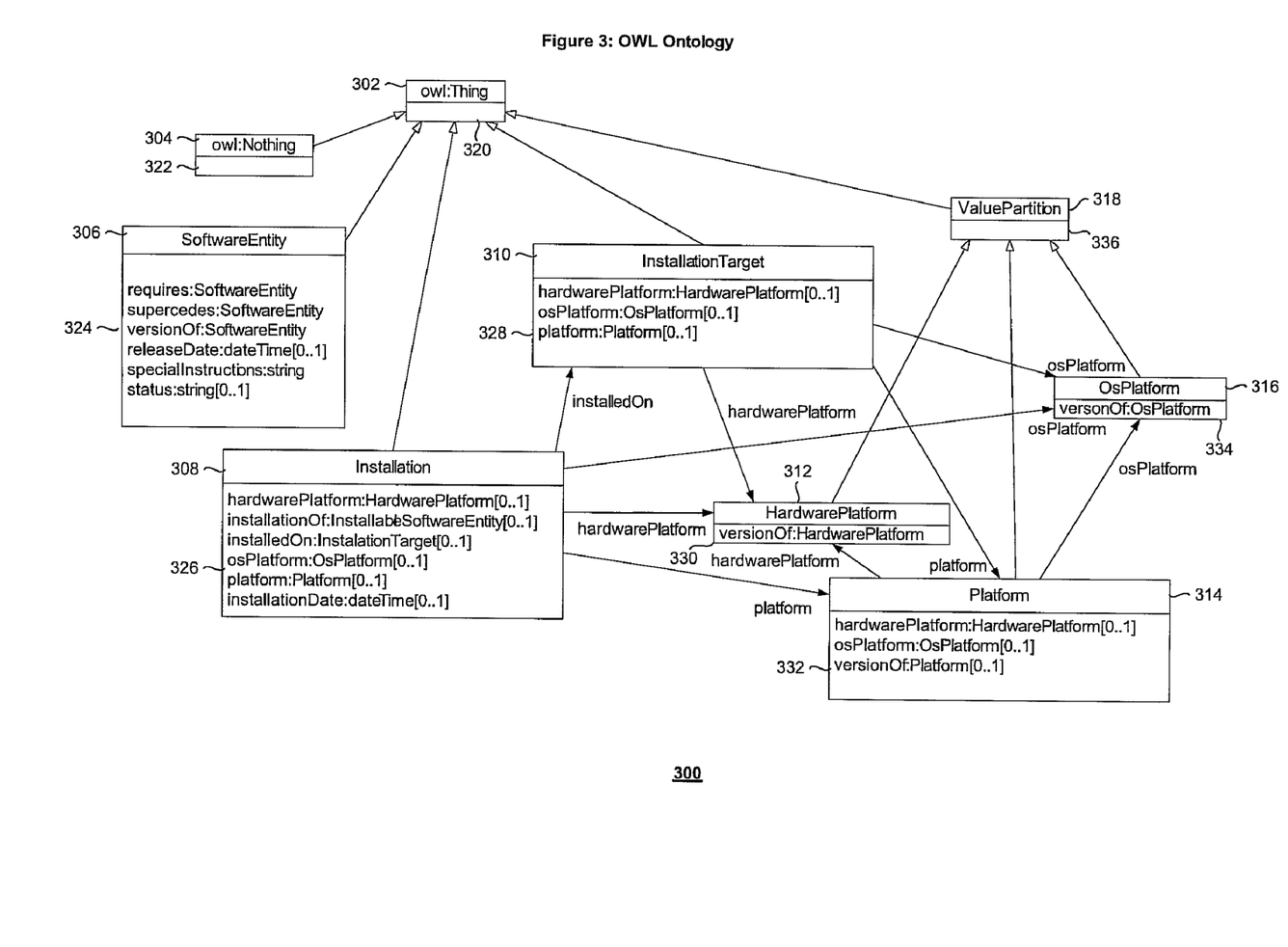
FIG. 3 shows a representation of a Web Ontology Language (OWL) ontology representing concepts and relationships between entities associated with a software product and any related patches.
Figure 4:
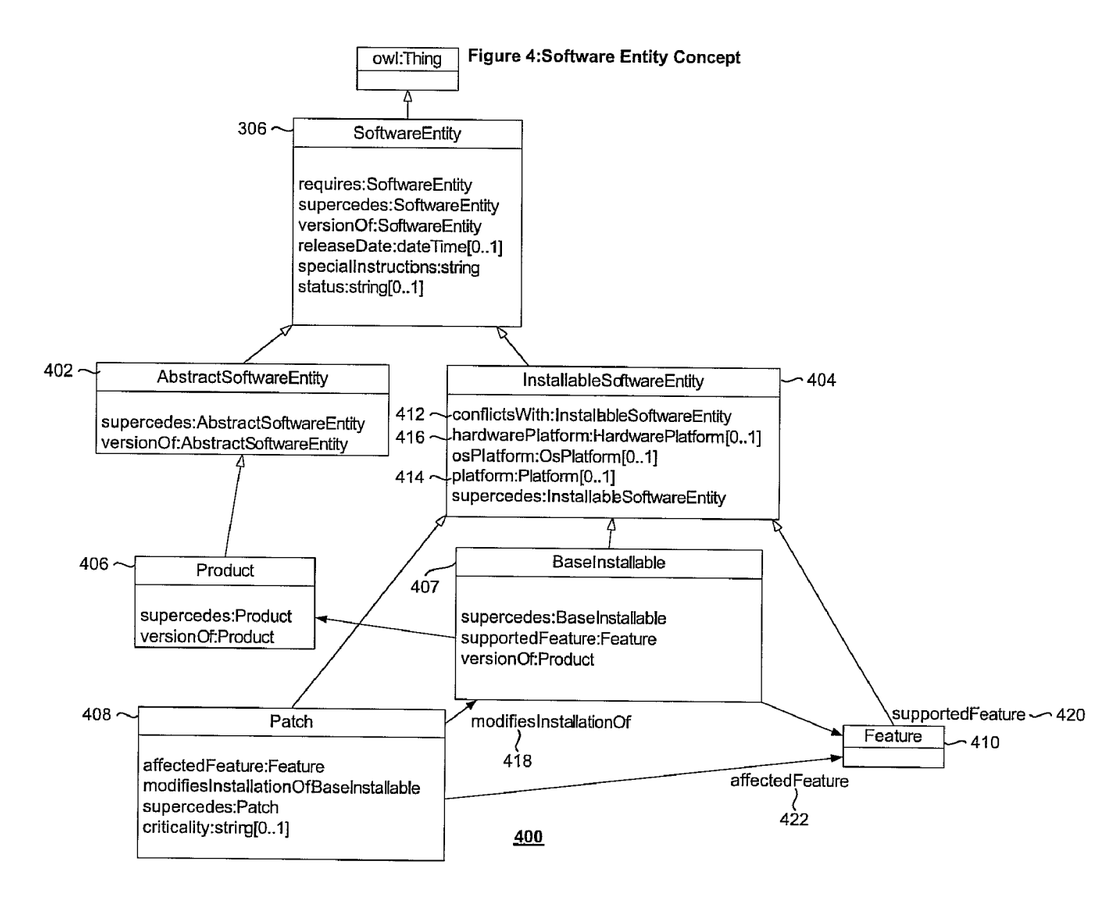
FIG. 4 illustrates an owl ontology representation of a software entity concept associated with the owl ontology shown in FIG. 3.
Figure 5:
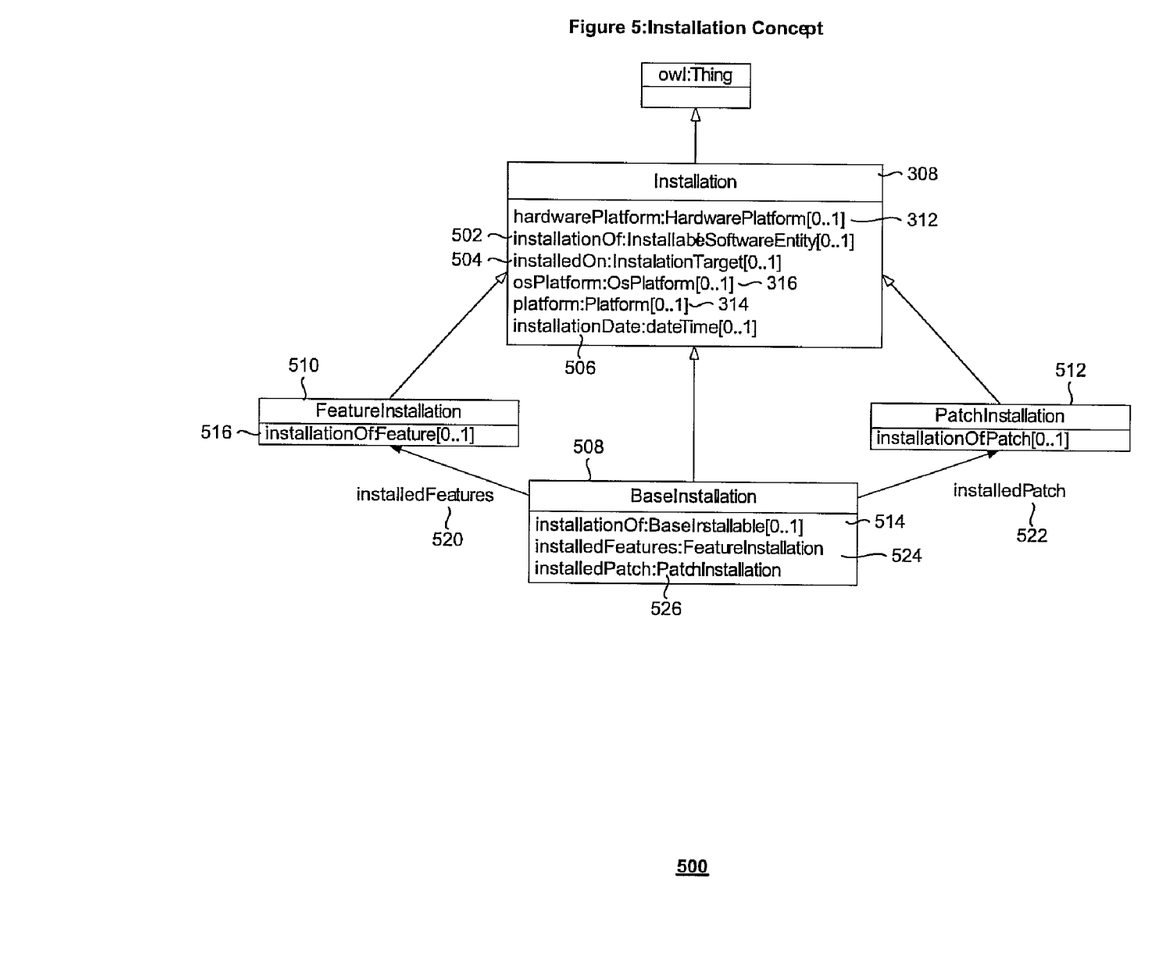
FIG. 5 depicts an installation concept associated with the owl ontology shown in FIG. 3.

FIG. 3 shows a top level of an OWL ontology 300. This view of the ontology graph forms part of the RDF OWL ontology 126. The convention for interpreting the relationships between the entities shown in FIGS. 3 to 5 is as follows. An arrows with an unshaded head, such as, for example, the arrow between the "owl: Thing" 302 and the "SoftwareEntity" 306 is used to express a subclass relationship, that is, "SoftwareEntity" 306 is a subclass of "owl: Thing" 302. The arrows with a shaded or full head such as, for example, the arrow between "Installation" 308 and "HardwarePlatform" 312 is used to express relationships between subclasses, that is, they express object relations. The ontology 300 comprises, as would be expected by one skilled in the art, and "owl: Thing" 302 having dependent therefrom than "owl: Nothing" 304. Depending from "owl: Thing" 302 are also the "SoftwareEntity" 306 and "Installation" 308, an "InstallationTarget" 310, the "HardwarePlatform" 312, a "Platform" 314, and "OsPlatform" 316 and a "ValuePartition" 318. The entities 302 to 318 are ontology concepts that are associated with a software installation. It can be appreciated that each concept has a respective set of concepts or attributes 320 to 336. Although the OWL ontology described herein is described as having a first level, one skilled in the art appreciates that this is for convenience only and is not intended to import or impose any limitation regarding the ontology or, more particularly, the graph representing the ontology. One skilled in the art appreciates that ontologies are generally expressed as or can be thought of as an arbitrary graph that reflects the concepts and relationships intended for the ontology.

In the following the prefix "ovp:" is declared in N3 (rather a subset thereof known as Turtle) or RDF as prefix ovp:

http://jena.hpl.hp.com/vocabularies/ovpatch#, which is a prefix pointing to the ontology defining vocabulary terms, that is, concepts and relations, corresponding to or defined by the ontology described with reference to FIGS. 3 to 5. It can be appreciated that appendices 1 and 2 are ontologies expressing the vocabulary terms, concepts and relations. Appendix 1, ovpatch.owl, is a serialisation of an RDF graph that encodes the ovpatch ontology. Appendix 2, ovpatch.n3, is also a serialisation of the same RDF graph that encodes the ovpatch ontology but it is expressed using Turtle/N3 as opposed to owl; the former being more readable and easier to manipulate.

At this level, the ontology divides into four major sub classes; namely, ovp:Installation, ovp:InstallationTarget, ovp:SoftwareEntity and ovp:ValuePartition. The subclass ovp:ValuePartition contains the following distinct sub classes or concepts ovp:Platform, ovp:HardwarePlatform and ovp:OsPlatform. Instances of these concepts denote the kinds of platform upon which the intended installation set 206 can be installed. Software entities intended to be installed on a given hardware and operating system combination would, for example, reference the concepts ovp:HardwarePlatform and ovp:OsPlatform, which are embodied in the concept of a hardware and operating system platform known as ovp:Platform. The concept ovp:Platform 314 represents the type of things upon which the intended installation 104 or the intended installation set 206 can be installed.

It can be appreciated that the sets of properties or attributes 320 and 322 corresponding to the "owl:Thing" 302 and "owl:Nothing" 304 are empty sets.

The "SoftwareEntity" 306 has six associated concepts. The "SoftwareEntity" concept 306 is described in greater detail with reference to the set 400 of concepts, relationships and subclasses shown in FIG. 4. Again, it will be appreciated that the graph of FIG. 4 forms part of the above described RDF OWL ontology 126. Referring to FIG. 4, it can be appreciated that the "SoftwareEntity" concept 306 comprises the following common properties or relations:

ovp:requires, which is used to encode a dependency relationship between software entities such that an installation of one software entity, on some installation target, depends on or requires the installation of another software entity, or an entity that supersedes the required software entity, on the same installation target. The property or relation ovp:requires is a transitive relation.

ovp:supersedes which, in the case of an ovp:SoftwareEntity, is constrained through the class hierarchy such that a thing only supersedes something of the same (or more specific) kind. This is a transitive supersedes relationship or relation between concept instances;

ovp:versionOf for ovp:SoftwareEntity is constrained such that an ovp:SoftwareEntity may only be an ovp:versionOf another ovp:SoftwareEntity. Although there is no requirement that an ovp:SoftwareEntity be an ovp:versionOf anything. By convention, the most abstract thing at the top of an ovp:versionOf chain is marked as being an ovp:versionOf itself.

ovp:releaseDate, ovp:specialInstructions and ovp:status all represent simple, literal, metadata associated with the software entity.

Although the above embodiment of the ovp:SoftwareEntity concept 306 comprises the above common properties or relations, embodiments are not limited to such an arrangement. It will be appreciated by one skilled in the art that the set of such properties or relations can be varied according to requirements.

The concept ovp:SoftwareEntity 306 comprises two mutually exclusive subclasses, which are:

ovp:AbstractSoftwareEntity 402, which represents abstract concepts such as products and product releases; and ovp:InstallableSoftwareEntity 404 that is used to represent the installables for products, product features and patches, which are intended to include any form of installable update.

The subclass of ovp:AbstractSoftwareEntity 402 is ovp:Product 406, which is used to represent both products and product releases. This enables a chain of product, product release, product build abstractions related via ovp:versionOf relations as described above to be realised.

The subclass ovp:AbstractSoftwareEntity 402 imposes narrow constraints on the values of ovp:versionOf and ovp:supersedes as compared to ovp:SoftwareEntity 306.

The subclass or concept ovp:InstallableSoftwareEntity 404 comprises three distinct subclasses, which are:

ovp:BaseInstallable 407, which is used to model the base installable version of product, that is, the build of a particular product release for a particular product platform. It is installations of ovp:BaseInstallable 407 that are modified by patches.

ovp:Patch 408, which is used to model an installable, that is, installable software, that modifies the installation of another installable to allow, for example, the other installable to be maintained, repaired or updated.

ovp:Feature 410, which is used to model an installable feature of a product. This represents a choice to be made at the time of installing the product or feature. However, other features can be added to a product post-installation of the product or feature.

The ovp:InstallableSoftwareEntity 404 has the following properties or relations in addition to those inherited from ovp:SoftwareEntity 306: ovp:conflictsWith 412, which is a symmetric relation of ovp:InstallableSoftwareEntity 404 that indicates incompatibility between installables if installed on the same installation target; and ovp:platform 414, ovp:hardwarePlatform 416 and ovp:osPlatform 418 that indicate the kind of platform upon which the installable is installed or to which the installable is targeted.

Additionally, ovp:InstallableSoftwareEntity 404 further constrains the use of the following property or relation when used in conjunction with ovp:InstallableSoftwareEntity 404:

ovp:supercedes.

It will be appreciated that ovp:InstallableSoftwareEntity is a subclass of an anonymous class that has a property restriction on ovp:superseces such that ALL object values are a more restrictive subclass than the natural range of the property as can be appreciated from the following extract taken from Appendix 2

```
:supersedes
  a      owl:ObjectProperty , owl:TransitiveProperty ;
  rdfs:domain :SoftwareEntity ;
  rdfs:label "supercedes (relation)"^^xsd:string ;
  rdfs:range :SoftwareEntity ;
  dc:description "A relation between software entities where the subject supercedes the object."^^xsd:string .
:InstallableSoftwareEntity
  a     owl:Class ;
  rdfs:label "installable software entity (class)"^^xsd:string ;
  rdfs:subClassOf :SoftwareEntity ;
  rdfs:subClassOf
     [a      owl:Restriction ;
      owl:allValuesFrom :InstallableSoftwareEntity ;
      owl:onProperty :supersedes
```

```
    ] ;
    dc:description "A class that represents the concept of an installable
software entity (which includes installers, updates, common components
and patches) targetted on a particular Os/Hardware
environment." xsd:string ;
```

The concept ovp:BaseInstallable 407 requires that any instances be ovp:versionOf an ovp:Product. The following relationships are also provided between instances of ovp:InstallableSoftwareEntity 404 subclasses:

ovp:modifiesInstallationOf 418, which is a relation between instances of ovp:Patch 408 and instances of ovp:BaseInstallable 407 whereby installation of the ovp:Patch modifies or updates installations of the corresponding ovp:BaseInstallable;

ovp:supportedFeature 420, which is a relation between instances of ovp:BaseInstallable 407 and instances of ovp:Feature 410 that the ovp:BaseInstallable 407 is capable of supporting;

ovp:affectedFeature 422, which is a relation between instances of ovp:Patch 408 and instances of ovp:Feature 410 such that, for example, patch recommendations may be pruned to only those that affected installed ovp:Features 410.

Referring to FIG. 5, there is shown a set 500 of subclasses and relations relating to ovp:Installation 308, which is used to model product, feature and patch installations. Again, it will be appreciated that the graph of FIG. 5 forms part of the above described RDF OWL ontology 126. An ovp:Installation 308 has the following properties and relations:

ovp:platform 314, ovp:hardwarePlatform 312 and ovp:osPlatform 316, which are used to indicate the kind of platforms used to support the ovp:Installation 308;

ovp:InstallationOf 502, which is used to indicate what ovp:InstallableSoftwareEntity 404 the ovp:Installation 308 is an installation of;

ovp:InstalledOn 504, which is used to identify the target platform and target operating system, defined ovp:InstallationTarget 310, on which ovp:Installation 308 is installed. An ovp:InstallationTarget 310 is a distinct facility upon which installations can occur. A computer installation of some kind is typified by its hardware and operating system platform characteristics;

ovp:InstallationDate 506, which is used to indicate when the ovp:Installation 308 was installed.

It can be appreciated that the class or concept ovp:Installation 308 comprises a number of subclasses; namely, ovp:BaseInstallation 508, ovp:FeatureInstallation 510 and ovp:PatchInstallation 512 that are specialisations of ovp:Installation 308 such that ovp:installationOf 502 is restricted to reference an ovp:BaseInstallable 514, an ovp:Feature 516 or an ovp:Patch 518 respectively.

The relations ovp:installedFeature 520 and ovp:installedpatch 522 can be used to associate ovp:FeatureInstallation 524 and ovp:PatchInstallation 526 with an ovp:BaseInstallation 508. One skilled in the art, however, will appreciate that a single polymorphic relation could be used to attach patch, feature and required or related base installations to a given base installation.

The above described concepts and relations are associated with the domain model 124, the ideal product 104, whose model forms part of the domain model, and the installation model 136, which models the installed product 112 and its installed patches 128 to 134.

Below will be described a number of SPARQL queries that can be used in relation to the ontology 126, RDF domain model 124 and the RDF installation model 136. However, before describing the SPARQL queries in detail, a number of prefix declarations will be described. Again, the declarations will be in TURTLE, which can be viewed at http://www.dajobe.org/2004/01/turtle/ and which is incorporated herein by reference for all purposes. One skilled in the art will appreciate that the prefixes could have been defined in another way such as, for example, using some other semantic web language. The actual form of the declaration is unimportant unlike the relationship expressed between the prefixes and their corresponding URIs.

```
       #
# Standard RDF, RDFS and OWL Namespace Decls.
       #
@prefix rdf:    <http://www.w3.org/1999/02/22-rdf-syntax-ns#> .
@prefix rdfs:   <http://www.w3.org/2000/01/rdf-schema#> .
@prefix owl:    <http://www.w3.org/2002/07/owl#> .
       #
# Dublin Core Namespace Decls
       #
@prefix dc:     <http://purl.org/dc/elements/1.1/> .
@prefix dcterms: <http://purl.org/dc/terms/> .
       #
# Patch Ontology Namespace Decls.
       #
@prefix ovp:       <http://jena.hpl.hp.com/vocabularies/ovpatch#> .
@prefix patchbase: <http://jena.hpl.hp.com/ovpatch/patch/> .
@prefix product:   <http://jena.hpl.hp.com/ovpatch/product/> .
@prefix platform:  <http://jena.hpl.hp.com/ovpatch/platform/> .
@prefix feature:   <http://jena.hpl.hp.com/ovpatch/feature/> .
``` ovp: is a prefix used for vocabulary terms (concepts and relations) of the ontology 126, which is described in greater detail in appendices 1 and 2.

patchbase: is a URI prefix used for assigning URI names to patches. One skilled in the art should appreciated that it is the patch that is being named rather than the location of some patch docs or patch binaries themselves. Therefore, for example, patch OVOW_00095 is assigned the URI name of <http://jena.hpl.hp.com/ovpatch/patch/OVOW_00095> or patchbase:OVOW_00095 if the above prefix declarations are in scope.

product: is a URI prefix used for assigning URI names to products, product releases and product installables, the latter being targeted on a specific type of platform.

platform: is a URI prefix used for assigning URI names to hardware, operating systems and hardware/operating system combination.

feature: is a URI prefix used for assigning URI names to product features.

Before subjecting an RDF installation model such as, for example, model 136 to an analysis, it is often desirable to check the integrity of the RDF Domain model 124, which is also known as the patch knowledge base. Patches make reference to other patches through ovp:requires and ovp:supercedes relationships. In some cases, although the existence of a patch can be inferred from such references, detailed information about the patch may be missing from the patch knowledgebase because, for example, a corresponding patch has not been processed. The SPARQL query shown in Table 1 below checks for known patches whose detailed information is missing from the patch knowledge base, that is, it represents a patch knowledge base closure check.

TABLE 1

```
 1: prefix ovp:      <http://jena.hpl.hp.com/vocabularies/ovpatch#>
 2: prefix patchbase: <http://jena.hpl.hp.com/ovpatch/patch/>
 3: prefix rdfs:     <http://www.w3.org/2000/01/rdf-schema#>
 4: prefix rdf:      <http://www.w3.org/1999/02/22-rdf-syntax-ns#>
 5:
 6: SELECT ?patch
 7: WHERE
 8: {
 9:   ?patch a ovp:Patch .
10:   OPTIONAL
11:   { ?patch ovp:modifiesInstallationOf ?pov . }
12:   FILTER (!bound(?pov))
13: }
```

It will be appreciated that lines 10 to 12 are key to this query. The absence of detailed information relating to a patch is detected by the absence of information relating to installations capable of being modified by the patch. It will be appreciated that for patches whose existence has merely been inferred from a reference in another patch or its domain model, the ovp:modifiesInstallationOf property value is missing and hence serves as a means to find other patches whose existence can be inferred but whose details are missing.

In order to refine the results provided by the above SPARQL query shown in Table 1, the following SPARQL query shown in Table 2 was developed to identify only those patches for which there is no record of a superseding patch in the patch knowledge base 124.

TABLE 2

```
 1: prefix ovp:      <http://jena.hpl.hp.com/vocabularies/ovpatch#>
 2: prefix patchbase: <http://jena.hpl.hp.com/ovpatch/patch/>
 3: prefix rdfs:     <http://www.w3.org/2000/01/rdf-schema#>
 4: prefix rdf:      <http://www.w3.org/1999/02/22-rdf-syntax-ns#>
 5:
 6: SELECT ?patch ?supercedingPatch ?pov
 7: WHERE
 8: {
 9:   ?patch a ovp:Patch .
10: #
11:   OPTIONAL
12:   { ?supercedingPatch ovp:supercedes ?patch . }
13:   FILTER( !bound(?supercedingPatch ) )
14: #
15:   OPTIONAL
16:   { ?patch ovp:modifiesInstallationOf ?pov . }
17:   FILTER (!bound(?pov))
18: #
19: } ORDER BY ?patch
```

It will be appreciated that lines 11 to 13 extend the earlier query shown in Table 1 with an extra OPTIONAL block and FILTER that remove patches that are known to have been superseded from the result set.

The result of the query shown in Table 2 will be a list of patches for which incomplete information is contained within the patch knowledge base thereby indicating that the identified patches have not been superseded.

In the SPARQL query shown in Table 3, it is hypothesized that a possible source of failed patch installations arises where an unsuperseded patch, A, depends on a non-critical patch, B. This identifies critical patches with non-critical dependencies. The SPARQL query shown in Table 3 identifies such situations.

TABLE 3

```
 1:prefix ovp:       <http://jena.hpl.hp.com/vocabularies/ovpatch#>
 2: prefix patchbase: <http://jena.hpl.hp.com/ovpatch/patch/>
 3: prefix rdfs:     <http://www.w3.org/2000/01/rdf-schema#>
 4: prefix rdf:      <http://www.w3.org/1999/02/22-rdf-syntax-ns#>
 5:
 6: SELECT DISTINCT ?patch ?reqdPatch ?super
 7: WHERE
 8: {
 9: # Range over the known patches.
10:   ?patch a             ovp:Patch;
11:       ovp:criticality ?criticality;
12:       rdfs:label      ?patchName .
13: # Keep the critical patches
14:   FILTER( regex( str(?criticality), "^yes","i" ) )
15: # Find those that have been superceded
16:   OPTIONAL
17:   {?super    ovp:supercedes ?patch . }
18: # Keep only those (critcial) patches that have not been superceded.
19:   FILTER (!bound(?super))
20: # Find patches that are required by the patches that are left
21: # ie. (unsuperceded and critcial patches)
22:   OPTIONAL
23:   { ?patch ovp:requires ?reqdPatch .
24:       ?reqdPatch ovp:criticality ?subcrit .
25:   }
26: # Keep only required critcial patches that have require another patch.
27:   FILTER bound(?reqdPatch)
28: # Keep those required critical patches whose required patches are *not* critical
29:   FILTER ( regex(str(?subcrit), "^no","i" ) )
30: }
31: ORDER BY asc( ?patchName )
```

Referring to Table 3, lines 1 to 4 establish namespace prefixes for use within the query as a means to aid readability and to reduce the overall size of the query.

Lines 6 to 7 set up the variables sought in the result set and open the WHERE clause that contains the main body of the query. The body of the query, lines 9-29, contains a number of basic triple patterns (subject, predicate, object patterns). The action of executing the query generates a results set in which each row represents a set of variable bindings such that: if the variable was replaced with the values bound to them in a row of the result set, the corresponding set of triples would be found or entailed in the graph being queried.

Lines 9 to 14 seek critical patches. The FILTER in line 14 tests opening letters of the value of the ovp:criticality property of a patch. Alternative embodiments can be realised in which the representation of criticality is changed to a resource that has both a Boolean value and a comment literal, which will improve detection of critical/non-critical patches from within SPARQL. Due to line 14, variable bindings that do not result in an ovp:criticality value that begins with "Yes" are rejected from the result set.

Lines 16 to 19 perform a test to reject unsuperseded patches from the result set. It is not required that bindings are found that match the OPTIONAL block that begins at line 16. However, if the variable ?super is unbound, then no patches are found that supersede the patch bound by the variable ?patch. The FILTER at line 19 allows only unsuperseded patches into the result set.

Lines 22 to 27 are a second OPTIONAL block that use a similar !bound FILTER to remove patches that are not dependent on other patches from the result set.

In line 29 the FILTER only allows result set entries where a required patch, bound to ?reqdPatch is non-critical.

The above SPARQL queries shown in and described with reference to Tables 1 to 3 relate to checks or investigations performed on the patch knowledge base 124 itself. There will now be described SPARQL queries relating to checks or investigations performed on, or at least using, the RDF installation model 136.

The SPARQL query shown in Table 4 determines whether or not information relating to the RDF installation model 136, otherwise known as a base software installation model corresponding to the installed software set 208, contains references to patches for which information is missing from the patch knowledge base 124. This query relies on the fact that whilst the existence of patches can be inferred from ovp:installedPatch in installation information and from ovp:supercedes and ovp:requires references in patch data, substantive information about a given patch is missing unless it has been acquired from a patch. In particular, when patch data is missing no values are available for ovp:modifiesInstallationOf.

TABLE 4

```
 1: prefix ovp:       <http://jena.hpl.hp.com/vocabularies/ovpatch#>
 2: prefix patchbase: <http://jena.hpl.hp.com/ovpatch/patch/>
 3: prefix rdfs:      <http://www.w3.org/2000/01/rdf-schema#>
 4: prefix rdf:       <http://www.w3.org/1999/02/22-rdf-syntax-ns#>
 5:
 6: SELECT ?povName ?patch ?supercedingPatch
 7: WHERE
 8: {
 9:   # Find base installations and their patches.
10:   ?inst a             ovp:BaseInstallation;
11:      ovp:installationOf [a ovp:BaseInstallable; rdfs:label ?povName ];
12:      ovp:installedPatch [a ovp:PatchInstallation; ovp:installationOf
            ?patch];
13:         .
14: # Find out if there is patch data about what the patch modifies.
15: OPTIONAL
16: {
17:     ?patch ovp:modifiesInstallationOf ?pov .
18:     #See if there is info about patches that superceded the installed
            patch.
19:     OPTIONAL
20:     { ?supercedingPatch ovp:supercedes ?patch . }
21:  }
22:  # Allow only patches for which we have no data into the result set.
23:  FILTER (!bound(?pov))
24: } ORDER BY ?povName ?patch ?supercedingPatch
```

Lines 1 to 4 establish namespace prefixes for the query. Lines 6 to 7 set the reported result set variable bindings. Lines 9 to 13 generate bindings that bind: ?inst to an ovp:BaseInstallation; ?povName to a displayable label that carries a name for the ovp:BaseInstallable that the installation is an installation of; ?patch to a patch installed under the ovp:BaseInstallation bound to ?inst. Lines 15 to 21 identify patch data by attempting to generate a binding for ?pov. If ?pov remains unbound then detailed patch data is for this patch is missing. Lines 19 to 20 look for a patch that will supersede the installed patch bound to ?patch by attempting to generate a binding for ?supercedingPatch. Line 23 admits only installed patches with missing patch data into the result set.

The SPARQL query shown in Table 5 performs a check for unsatisfied patch dependencies in base software installations. A patch dependency arises when an installed patch is dependent on another patch. A patch dependency is satisfied by the installation of either the required patch or a patch that supersedes the required patch.

TABLE 5

```
 1: prefix ovp:       <http://jena.hpl.hp.com/vocabularies/ovpatch#>
 2: prefix patchbase: <http://jena.hpl.hp.com/ovpatch/patch/>
 3: prefix rdfs:      <http://www.w3.org/2000/01/rdf-schema#>
 4: prefix rdf:       <http://www.w3.org/1999/02/22-rdf-syntax-ns#>
 5:
 6: SELECT DISTINCT ?hostName ?povName ?patch ?requiredPatch
      ?found
```

TABLE 5-continued

```
 7: WHERE
 8: {
 9: #   Match ovp:BaseInstallation (?inst) which have installed patches
        (?patch)
10:   ?inst a                  ovp:BaseInstallation;
11:      ovp:installationOf [a ovp:BaseInstallable; rdfs:label ?povName ] ;
12:      ovp:installedOn    [a ovp:InstallationTarget; rdfs:label
           ?hostName] ;
13:         ovp:installedPatch    [a ovp:PatchInstallation;
      ovp:installationOf ?patch] ;
14:         .
15: #   Filter out patches that have been superceded by other installed
        patches.
16:   OPTIONAL
17:   {
18:      ?inst  ovp:installedPatch    [a ovp:PatchInstallation;
      ovp:installationOf ?p2].
19:      ?p2    ovp:supercedes        ?patch .
20:   }
21:   FILTER (!bound(?p2))
22: #   Match patch dependencies of patches required by the installed
        patch.
23:   ?patch ovp:requires            ?requiredPatch .
24: #   Find installations of either the requiredPatch or a patch that
25: #   supersedes the required patch.
26:   OPTIONAL
27:   {
28:     {
29:      ?inst ovp:installedPatch    ?reqd .
30:      ?reqd ovp:installationOf    ?requiredPatch .
31:     }
32:   UNION
33:     {
34:      ?supercedingPatch
35:            ovp:supercedes         ?requiredPatch .
36:      ?inst ovp:installedPatch    ?reqd .
37:      ?reqd ovp:installationOf    ?supercedingPatch .
38:     }
39:   ?reqd ovp:installationOf ?found .
40:   }
41: #   Filter so that only allow installed patches with unsatisfied
        dependencies
42: #   are placed in the result set.
43:   FILTER( !bound(?reqd))
44: } ORDER BY ?hostName ?patch ?requiredPatch ?found
```

As previously, lines 1 to 4 declare the namespace prefixes used within the query. Line 6 establishes those variable bindings that are recorded in the results set. Lines 7 to 44 contain the main body of the query. Lines 10 to 14 match instances of ovp:BaseInstallation that have been patched. A matching base software installation is bound to the variable ?inst; the display name of the corresponding ovp:BaseInstallable is bound to the variable ?povName. Likewise, the host name, extracted from the corresponding rdfs:label, is bound to the variable ?hostName; and an installed patch is bound to the variable ?patch. In lines 16 to 21 the OPTIONAL block and FILTER seeks to exclude installed patches that have been superseded by the installation of a superseding patch. The OPTIONAL block attempts to bind the variable ?p2 to installed patches within the same base installation that supersede the patch bound to the variable ?patch. If such a patch is found, ?p2 is bound and the FILTER at line 21 removes the corresponding row from the result set.

Having ensured that only patches whose installation has not been superseded become bound to ?patch, line 23 performs two functions. Firstly, it ensures that only bindings where the patch bound to ?patch has one or more dependencies reach the result set and, secondly, it binds required patches to the variable ?requiredPatch. In lines 26 to 40, the OPTIONAL block contains a UNION. The first half of the UNION, lines 28 to 31, attempts to bind the variable ?reqd to an installation of the required patch bound to ?requiredPatch.

The second half of the UNION attempts to bind the variable ?reqd to the installation of a patch that supersedes the required patch bound to ?requiredPatch, in which case the variable ?supercedingPatch is bound to an installed patch that supersedes the required patch. At line 39, regardless of which half of the UNION, if any, binds a value to ?reqd, the patch that satisfies the requirement is bound to the variable ?found. ?found, ?reqd and ?supercedingPatch may all remain unbound by the OPTIONAL in which a required patch dependency arising from the installation of the patch bound to ?patch has not been satisfied. The FILTER at line 43 removes results where the patch dependency has been satisfied from the results set, which leaves results set entries for patch installations whose dependencies have not been satisfied. One skilled in the art will note that because any required or superseding patch bound in lines 26 to 40 is an installed patch, any further dependencies arising from that patch installation will be checked by attempts to generate result bindings when that patch is bound to ?patch.

Embodiments can be realised in which a patch is only deemed relevant to an installation if the patch is marked as affecting the particular product operating system version. The above query can be refined to address this change by replacing lines 10 to 14 of Table 5 with the code shown in Table 6 below:

TABLE 6

```
?inst      a              ovp:BaseInstallation;
ovp:installationOf   ?pov;
  ovp:installedOn    [a ovp:InstallationTarget; rdfs:label ?hostName] ;
  ovp:installedPatch [a ovp:PatchInstallation; ovp:installationOf ?patch] ;
  .

?pov     a ovp:BaseInstallable; rdfs:label ?povName .
```

The code in Table 6, firstly, generates a binding for the new variable ?pov to the installed base installable, which was previously left blank, and secondly, adds the following lines shown in Table 7 betweens line 43 and 44 of the SPARQL query shown in and described with reference to Table 5 or 6:

TABLE 7

```
OPTIONAL
{ ?requiredPatch ovp:modifiesInstallationOf ?pov2 .
  ?pov2 rdfs:label ?pov2Name .
}
FILTER( bound(?pov2) && (?pov=?pov2))
```

The code of Table 7 only allows patches that affect the installed product into the result set.

The SPARQL query shown in Table 8 below generates patch update recommendations for those patches that are currently installed and that have been superseded and for those patches upon which the currently installed but superseded patches depend. It will be appreciated that the query does not recommend all updates relating to an installed product. It merely recommends updates relating to those patches that are already installed.

TABLE 8

```
 1: prefix ovp:       <http://jena.hpl.hp.com/vocabularies/ovpatch#>
 2: prefix patchbase: <http://jena.hpl.hp.com/ovpatch/patch/>
 3: prefix rdfs:      <http://www.w3.org/2000/01/rdf-schema#>
 4: prefix rdf:       <http://www.w3.org/1999/02/22-rdf-syntax-ns#>
 5:
 6: SELECT DISTINCT ?hostName ?povName ?recPatch WHERE
```

TABLE 8-continued

```
 7: {
 8:   ?inst a ovp:BaseInstallation;
 9:         ovp:installedOn    [a ovp:InstallationTarget; rdfs:label
                                 ?hostName ];
10:         ovp:installationOf ?pov;
11:         ovp:installedPatch [ a ovp:PatchInstallation;
                                 ovp:installationOf ?patch];
12:         .
13:   ?pov  a ovp:BaseInstallable; rdfs:label ?povName .
14: #
15:   OPTIONAL
16:   { ?supersedingPatch ovp:supersedes ?patch .
17:     OPTIONAL
18:       { ?p1 ovp:supersedes ?supersedingPatch .}
19:   }
20:   FILTER (bound(?supersedingPatch) && !bound(?p1))
21: #
22: # ?supersedingPatch now binds a patch that supersedes the installed
     patch bound to ?patch
23: #
24:   OPTIONAL
25:   {
26:     # Recommend the superseding patch
27:     { ?recPatch ovp:supersedes ?patch .
28:       FILTER (?recPatch = ?supersedingPatch)
29:     }
30:     UNION
31:     # recommend an unsuperseded dependency of the
        ?supersedingPatch
32:     { ?supersedingPatch ovp:dependencySatisfiedBy ?recPatch .
33:       OPTIONAL
34:         { ?p2 ovp:supersedes ?recPatch .}
35:       FILTER( !bound(?p2) )
36:     }
37: }
38: #
39: # Filter patches that do not affect the current installation
40: #
41:   OPTIONAL
42:   { ?recPatch ovp:modifiesInstallationOf ?pov2 }
43:   FILTER( bound(?pov2) && ?pov2=?pov)
44: #
45: # Filter recommended patches that are already installed
46: #
47:   OPTIONAL
48:   { ?inst ovp:installedPatch ?i2 .
49:     ?i2 ovp:installationOf ?recPatch .
50:   }
51:   FILTER( !bound(?i2) )
52: } ORDER BY ?hostName ?povName ?recPatch
```

Referring to Table 8, lines 7 to 52 contain the main block of the query. Lines 7 to 13 find the patches installed with each base software installation. They bind base software installations to ?inst, the corresponding base installable software entity to ?pov and installed patches (successively) to ?patch. Lines 15 to 20 find unsuperseded patches that supersede each installed patch. They bind <code?>supersedingPatch</code> to an unsuperseded patch that supersedes the installed patch bound to ?patch. Lines 24 to 37 contain an OPTIONAL block having a UNION that assembles recommended patches in the variable ?recPatch. The first half of the UNION acts to copy supersedingPatch to ?recPatch. The second clause of the UNION, lines 32 to 36, binds all unsuperseded patches that satisfy dependencies for the ?supersedingPatch, which is also a binding for ?recPatch to ?recPatch. Referring to lines 41 to 51, the two OPTIONAL/FILTER combinations remove from the result set, firstly, patches that are not applicable to the current installation and, secondly, patches that are currently installed.

The SPARQL query shown in Table 9 generates patch recommendations for all unsuperseded patches and their potentially non-critical dependencies that are not currently installed.

TABLE 9

```
 1: prefix ovp:      <http://jena.hpl.hp.com/vocabularies/ovpatch#>
 2: prefix patchbase: <http://jena.hpl.hp.com/ovpatch/patch/>
 3: prefix rdfs:     <http://www.w3.org/2000/01/rdf-schema#>
 4: prefix rdf:      <http://www.w3.org/1999/02/22-rdf-syntax-ns#>
 5:
 6: SELECT DISTINCT ?hostName ?povName ?recPatch
 7: WHERE
 8: {
 9:   ?inst a                ovp:BaseInstallation;
10:      ovp:installationOf  ?pov;
11:      ovp:installedOn    [a ovp:InstallationTarget; rdfs:label
         ?hostName] ;
12:      .
13:   ?pov a ovp:BaseInstallable; rdfs:label ?povName .
14:   #
15:   # Bind ?patch to relevant critical patches
16:   #
17:   ?patch ovp:modifiesInstallationOf ?pov;
18:       ovp:criticality ?criticality;
19:       .
20:   FILTER (regex(str(?criticality),"^Yes.*","i") )
21:   #
22:   # Filter superseded patches
23:   #
24:   OPTIONAL
25:   { ?p1 ovp:supersedes ?patch .}
26:   FILTER( !bound(?p1))
27:   #
28:    # Form recommendation from unsuperseded critical patches and
their dependencies.
29:   #
30:   { ?recPatch ovp:modifiesInstallationOf ?pov.
31:      FILTER (?recPatch=?patch)
32:   }
33:   UNION
34:   { ?patch ovp:dependencySatisfiedBy ?recPatch .
35:      ?recPatch ovp:modifiesInstallationOf ?pov.
36:      OPTIONAL
37:      { ?p2 ovp:supersedes ?recPatch .}
38:      FILTER (!bound(?p2))
39:   }
40:   #
41:   # Filter already installed patches
42:   #
43:   OPTIONAL
44:   { ?inst ovp:installedPatch ?i2 .
45:      ?i2 ovp:installationOf ?patch.
46:   }
47:   FILTER (!bound(?i2))
48: } ORDER BY ?hostName ?povName ?recPatch
```

Referring to Table 9, lines 9 to 13 find base software installations and bind ?inst to a base software installation, ?pov to the corresponding base installable and ?hostName to the host name of the corresponding installation target. Lines 17 to 26 find unsuperseded critical patches associated with the base installable bound to ?pov that are bound to ?patch. Lines 30 to 38 generate patch recommendations bound to ?recPatch from the unsuperseded critical patches bound to ?patch as per line 30 to 32 unioned with relevant unsuperseded patches that satisfy the dependencies of those unsuperseded critical patches. The relevant unsuperseded patches are relevant in the sense that they are applicable to the current installation, that is, bound to ?inst. Lines 43 to 47 remove patches that are already installed from the result set.

Table 10 shows a SPARQL query that identifies patch recommendations for all unsuperseded patches and their dependencies.

TABLE 10

```
 1: prefix ovp:      <http://jena.hpl.hp.com/vocabularies/ovpatch#>
 2: prefix patchbase: <http://jena.hpl.hp.com/ovpatch/patch/>
 3: prefix rdfs:     <http://www.w3.org/2000/01/rdf-schema#>
```

TABLE 10-continued

```
 4: prefix rdf:      <http://www.w3.org/1999/02/22-rdf-syntax-ns#>
 5:
 6: SELECT DISTINCT ?hostName ?povName ?recPatch
 7: WHERE
 8: {
 9:   # Match base software installations, their installed patches and
product installable
10:   ?inst a                ovp:BaseInstallation;
11:       ovp:installationOf  ?pov;
12:               ovp:installedOn       [ a ovp:InstallationTarget;
      rdfs:label ?hostName];
13:       .
14:   ?pov a              ovp:BaseInstallable;
15:       rdfs:label      ?povName.
16:   #
17:   # Match patches appropriate to installed product release and platform
18:   #
19:   ?patch
20:       ovp:modifiesInstallationOf
21:                     ?pov .
22:   # Find and filter superseded patches.
23:   OPTIONAL
24:   { ?supersedingPatch ovp:supersedes ?patch. }
25:   FILTER (!bound(?supersedingPatch))
26:   #
27:      # Assemble recommendation from unsuperseded patches plus their
dependencies.
28:   { ?recPatch ovp:modifiesInstallationOf ?pov .
29:      FILTER (?recPatch=?patch)
30:   }
31:   UNION
32:   { ?patch ovp:dependencySatisfiedBy ?recPatch .
33:      ?recPatch ovp:modifiesInstallationOf ?pov .
34:      OPTIONAL
35:      { ?p1 ovp:supersedes ?recPatch .}
36:      FILTER(!bound(?p1))
37:   }
38:   # Find and filter installed patches
39:   OPTIONAL
40:   { ?inst ovp:installedPatch ?i2 .
41:       ?i2 ovp:installationOf ?recPatch .
42:   }
43:   FILTER (!bound(?i2))
44: } ORDER BY ?hostName ?povName ?recPatch
```

The query shown in Table 10 is substantially identical to the SPARQL query shown in and described with reference to Table 9 but for the query in Table 10 omitting the filter that selects from critical patches.

Figure 6:
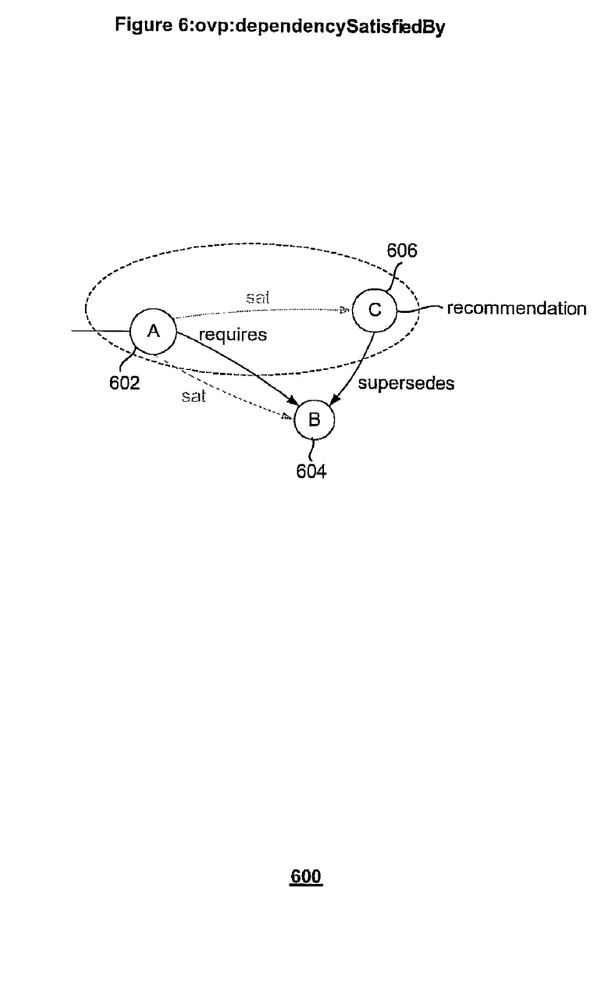
FIG. 6 illustrates a realisation of a dependency for implementing the relationship "dependency is satisfied by"

It will be appreciated that several of the above queries make reference to ovp:dependencySatisfiedBy. A graph 600 of this concept is shown in FIG. 6. As indicated above, a patch dependency arises when an installed patch is dependent on another patch. A patch dependency is satisfied by the installation of either the required patch or a patch that supersedes the required patch. Referring to FIG. 6, it can be appreciated that patch A 602 requires patch B 604. However, patch B 604 has been superseded by patch C 606. Therefore, the graph 600 results in the recommendation of patch C 606. The concept ovp:dependencySatisfiedBy can be expressed as follows

Figure 7:
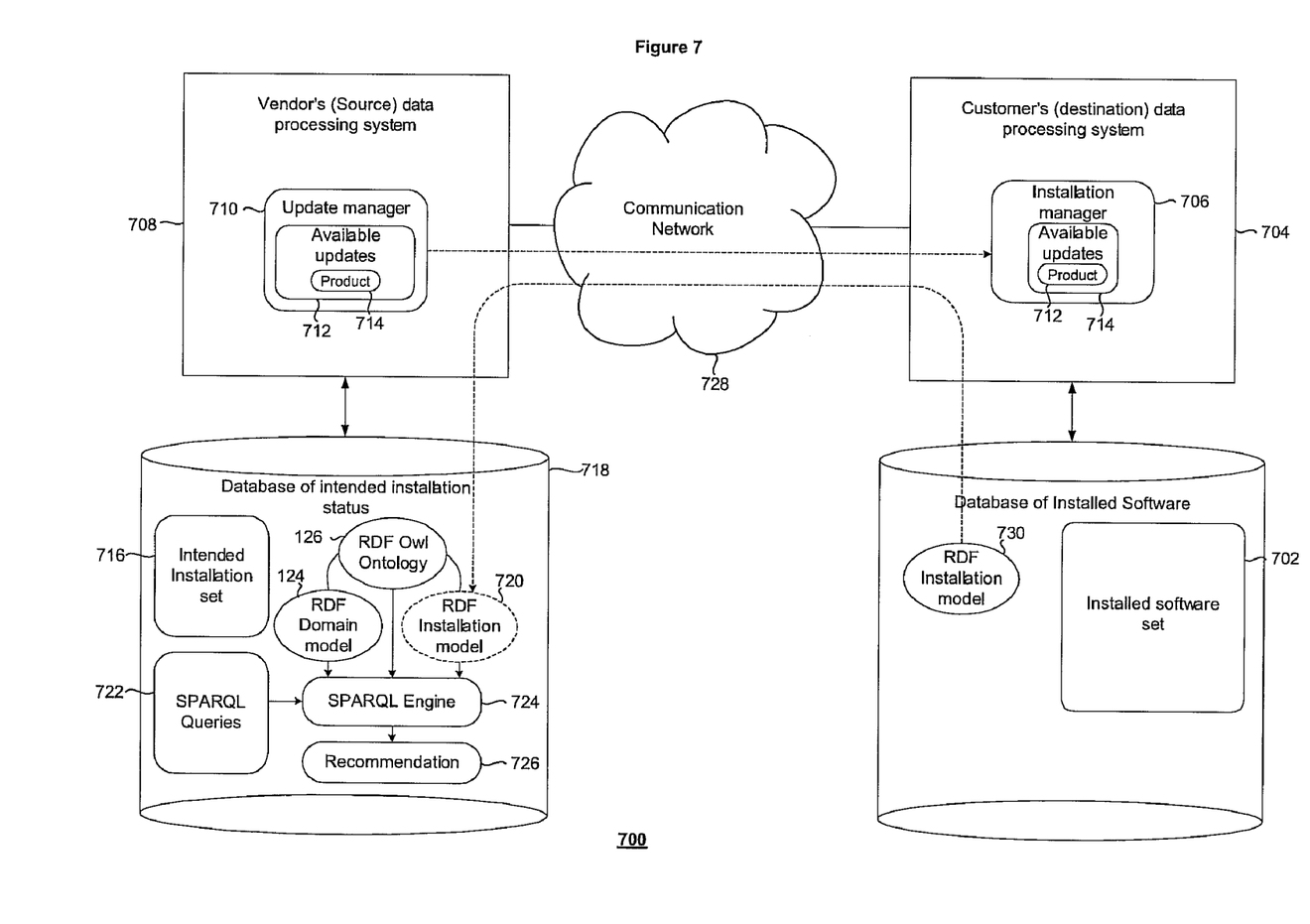
FIG. 7 depicts an arrangement for updating software, that is, an installed software set, associated with a customer's or destination data processing system.

```
(?x ovp:dependencySatisfiedBy ?y) <-  (?x ovp:requires ?y ) .
(?x ovp:dependencySatisfiedBy ?y) <-  (?x ovp:requires ?z ) ,
                                 (?y ovp:supersedes ?z ) .
(?x ovp:dependencySatisfiedBy ?y) <-  (?x
ovp:dependencySatisfiedBy ?z) ,
                                 (?z ovp:dependencySatisfiedBy
?y).
``` updates 712 are available for the installed software set 702 relating to the intended installation set 716. It will be appreciated that the update manager 710, in such an embodiment, would need to maintain a database of machines that have access to the installed software set 702 to be able to send to the installation managers 706 of those machines the indications that updates are available. In response to receiving an indication that software updates are available from the update manager 710, the installation manager 706 forwards the RDF installation model 730 to the update manager 710 so that it can be used in place of, or to populate, the RDF installation model 720. Once the RDF installation model 720 has been properly configured or replaced, the RDF installation model 720, the RDF OWL ontology 726 and the RDF domain model 724 are subjected to any one or more of the above described SPARQL queries 722 via the SPARQL engine 724 to produce a recommendation 726. The recommendation 726 might contain an indication of which, if any, patches should be installed to maintain, supplement or augment the installed software set 702. It will be appreciated that the actual content of the recommendation will be dependent, at least in part, upon the query executed in relation to the combined graph represented by the collection of the RDF OWL ontology 126, the RDF domain model 124 and the RDF installation model 720.

Alternatively, or additionally, the installation manager 706 can determine whether or not any updates are available for the installed software set 702 by interrogating, via the communication network 728, the update manager 710. The installation manager 706 provides an indication of the software associated with the customer's or destination data processing system to the update manager 710. The update manager 710 then determines whether or not any such updates are available. The update manager 710, having concluded the determination, forwards the results of that determination to the installation manager 706, which can act accordingly by either taking no action or requesting the most appropriate updates.

Although the above embodiments have been described with reference to the source data processing system, that is, the server side, performing the analysis that produces the recommendations, embodiments of the invention are not limited to such an arrangement. Embodiments can be realised in which the installation manager, for example, obtains and stores a local copy, or gains networked access to a copy, of the RDF OWL ontology 126, the RDF domain model 124 and one or more of the SPARQL queries 722. Once such a client side arrangement has a recommendation from a clientside, or other, SPARQL engine 724, the installation manager 706 can request one or more patches to maintain, augment or supplement the installation software set 702 in accordance with one or more recommendations from the SPARQL engine 724.

Although the above embodiments have been described with reference to customer support, that is, the relationship is between software vendor and software purchaser, embodiments are not limited thereto. Embodiments can be realised in which intra-enterprise support is provided to maintain an appropriate state of installed software within an enterprise. For example, upgrading software on machines within an enterprise may use embodiments of the present invention to ensure consistency.

As used herein, the term "critical patch" refers to a patch that addresses a software bug or fault without which the software might not operate as intended and without which the software could fail. In contrast, a "non-critical" patch refers to a patch that is not a critical patch. Examples of non-critical patches comprise patches that provide performance improvements or added functionality.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk The above concept can be implemented using preprocessing over the domains 124 and 136 or using a reasoner, such as, for example, Jena Rules, or both.

Referring to FIG. 7, there is shown an arrangement 700 for updating software 702, that is, the installed software set, associated with a customer's or destination data processing system 704. The destination data processing system 704 comprises an installation manager 706 for maintaining the installed software set 702.

A vendor's, or other source, data processing system 708 comprises an update manager 710 that is responsible for at least informing installation managers of other machines such as, for example, installation manager 706, that updates are available for a product. It can be appreciated that the update manager 710 comprises an indication of available updates 712 that relate to one or more than one product 714 or the intended installation set 716, which is comparable to the intended installation set 206 described above. A database 718 is associated with the source data processing system 708. The database 718 comprises the intended installation set 716, the above described RDF OWL ontology 126, the RDF domain model 124 modelling the intended installation set 716 and a notional or template RDF installation model 720 that is populated, or replaced, by an RDF installation model associated with an installed software set such as, for example, the installed software set 702 shown in FIG. 7. Also associated with the source data processing system 708 are the SPARQL queries 722 described above, in particular, with reference to the various tables. A SPARQL engine 724, which corresponds to the SPARQL engine 212 described above, processes the RDF OWL ontology 126, the RDF domain model 124 and the populated RDF installation model 720 together with the SPARQL queries 722, or at least one SPARQL query, to produce a recommendation 726 relating to the installed software set 702.

In operation, the update manager 710 forwards, via a communication network 728, an indication to the installation manager 706 that or magnetic tape. It will be appreciated that the storage devices and storage media are embodiments of machine-readable storage or computer-readable storage that are suitable for storing a program or programs that, when executed, implement embodiments of the present invention. Accordingly, embodiments provide a program comprising code for implementing a system or method as described herein or as claimed herein and machine readable storage storing such a program. Still further, embodiments of the present invention may be conveyed electronically via any medium such as a communication signal carried over a wired or wireless connection and embodiments suitably encompass the same.

The invention claimed is:

1. A data processing method executed by a processor comprising:
  subjecting one or more than one, in any combination, of
    a first entity comprising first meta-data, expressed using a semantic web language, defining at least one relationship between first software and at least one associated patch for the first software,
    a second entity comprising second meta-data, expressed using the semantic web language, defining at least one relationship between installed software and at least one installed patch for the installed software, and an ontology expressing concepts and relationships between software and at least one patch, to a query, expressed using the semantic web language, using a semantic web query language processing engine; and outputting data representing the result of said subjecting, said data relating to at least one of the first meta-data, the second meta-data and the ontology.

2. The data processing method as claimed in claim 1, further comprising subjecting at least one of the first meta-data, second meta-data and ontology to one or more than one query to assess an integrity of at least one of the first meta-data, second meta-data and ontology.

3. The data processing method as claimed in claim 1, further comprising identifying one or more than one patch of said at least one associated patch for the first software that is a critical patch.

4. The data processing method as claimed in claim 1, further comprising identifying one or more than one patch of said at least one associated patch for the first software that is a critical patch having at least one non-critical patch dependent on said critical patch.

5. The data processing method as claimed in claim 1, further comprising checking an integrity of at least one of the first meta-data, the second meta-data and the ontology.

6. The data processing method as claimed in claim 5 in which checking the integrity comprises identifying patch information associated with either or both of one or more than one patch of said at least one associated patch for the first software, and the at least one installed patch for the installed software.

7. The data processing method as claimed in claim 1, further comprising identifying at least one unsatisfied patch dependency in the at least one installed patch for the installed software.

8. The data processing method as claimed in claim 1, further comprising recommending at least one patch of said at least one associated patch for the first software for use with the installed software.

9. The data processing method as claimed in claim 8 in which said recommending comprises recommending one or more than one patch of said at least one associated patch for the first software only in relation to at least one patch of said at least one installed patch for the installed software that has been installed and superseded by at least one patch of said at least one associated patch for the first software.

10. The data processing method as claimed in claim 1, further comprising identifying, from one or more of said at least one associated patch for the first software and the at least one installed patch, any one of one or more than one unsuperseded patch;

one or more than one patch upon which the unsuperseded patch depends; and one or more than one patch upon which the unsuperseded patch depends having no correspondence with at least one installed patch for the installed software.

11. The data processing method as claimed in claim 10 in which one or both of the unsuperseded patch and the one or more than one patch upon which the unsuperseded patch depends has a first category.

12. The data processing method as claimed in claim 11 in which the first category is one or critical or non-critical.

13. The data processing method as claimed in claim 1, further comprising identifying software appropriate for maintaining a software installation; and materially maintaining the software installation by installing said identified software.

14. The data processing method as claimed in claim 1, wherein the subjecting further comprises subjecting the first entity, the second entity, and the ontology to the query.

15. A data processing system comprising:

data storage to store one or more of, in any combination, a first entity comprising first meta-data, expressed using a semantic web language, defining at least one relationship between first software and at least one associated patch for the first software, a second entity comprising second meta-data, expressed using the semantic web language, defining at least one relationship between installed software and at least one installed patch for the installed software, and an ontology expressing concepts and relationships between software and at least one patch; and a processor to subject at least one of the first entity, the second entity and the ontology to a query, expressed using the semantic web language, and output data representing a result of said subjecting, said data relating to at least one of the first meta-data, the second meta-data and the ontology.

16. A non-transitory computer readable storage medium storing a computer program comprising instructions arranged, when executed, to implement the steps of:

subjecting one or more than one, in any combination, of a first entity comprising first meta-data, expressed using a semantic web language, defining at least one relationship between first software and at least one associated patch for the first software, a second entity comprising second meta-data, expressed using the semantic web language, defining at least one relationship between installed software and at least one installed patch for the installed software, and an ontology expressing concepts and relationships between software and at least one patch, to a query, expressed using the semantic web language, using a semantic web query language processing engine; and outputting data representing the result of said subjecting, said data relating to at least one of the first meta-data, the second meta-data and the ontology.

17. The non-transitory computer readable storage medium as claimed in claim 16, further comprising instructions arranged to subject at least one of the first meta-data, second meta-data and ontology to one or more than one query to assess an integrity of at least one of the first meta-data, second meta-data and ontology.

18. The non-transitory computer readable storage medium as claimed in claim 16, further comprising instructions arranged to identify one or more than one patch of said at least one associated patch for the first software that is a critical patch.

19. The non-transitory computer readable storage medium as claimed in claim 16, further comprising instructions arranged to identify one or more than one patch of said at least one associated patch for the first software that is a critical patch having at least one non-critical patch dependent on said critical patch.

20. The non-transitory computer readable storage medium as claimed in claim 16, further comprising instructions arranged to check an integrity of at least one of the first meta-data, the second meta-data and the ontology.

* * * * *